July 4, 1961
M. HOERER
2,990,828
ROTARY SEGMENTAL SAW WITH RIM RIGIDIFYING
AND SILENCING MEANS
Filed Sept. 19, 1960
2 Sheets-Sheet 1
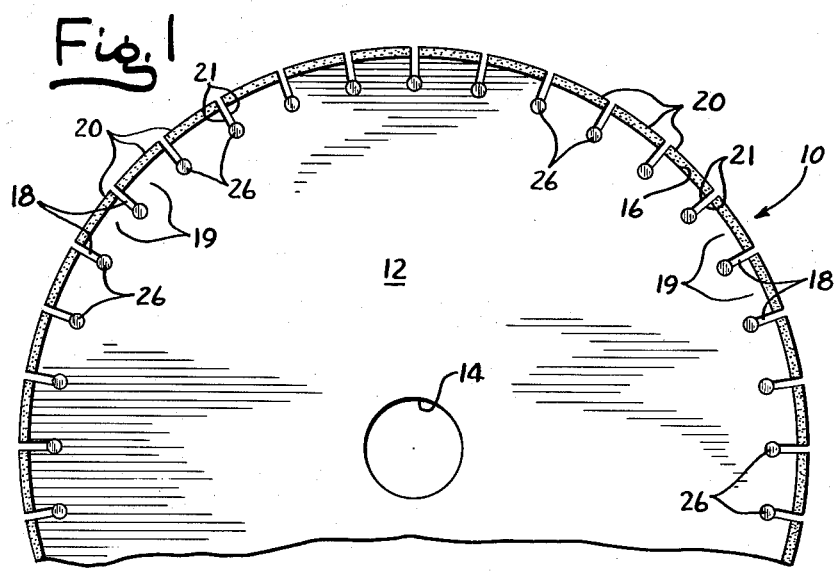
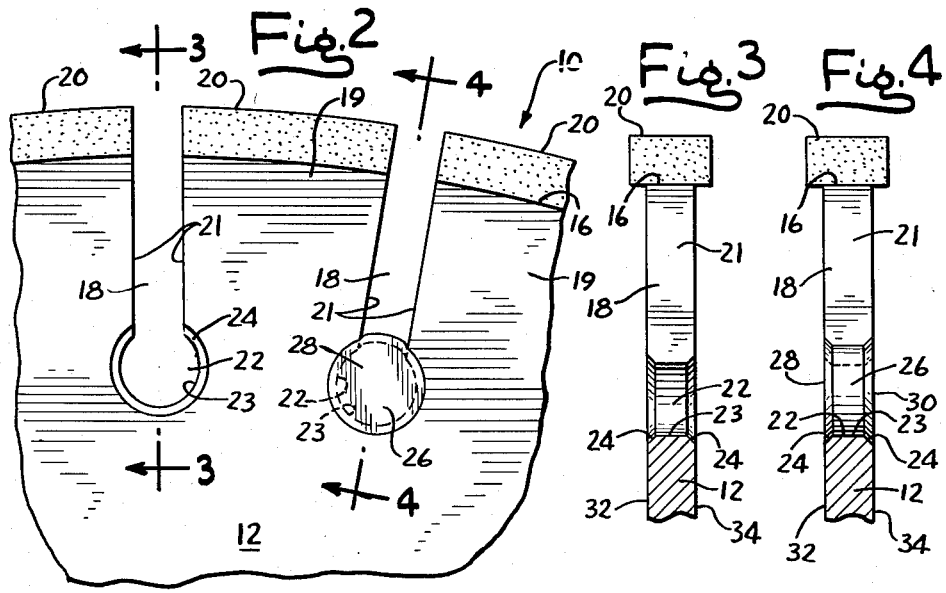
INVENTOR.
MARTIN HOERER
BY
ATTY.

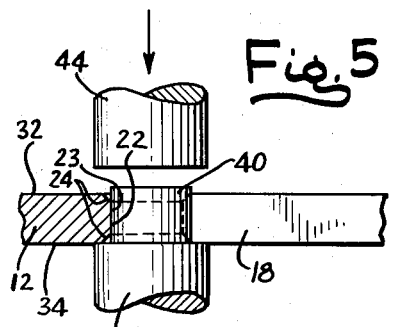
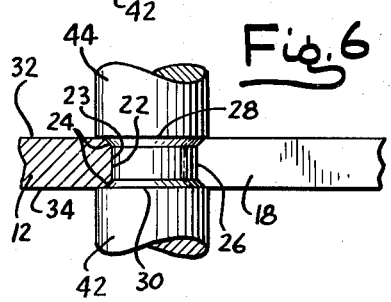
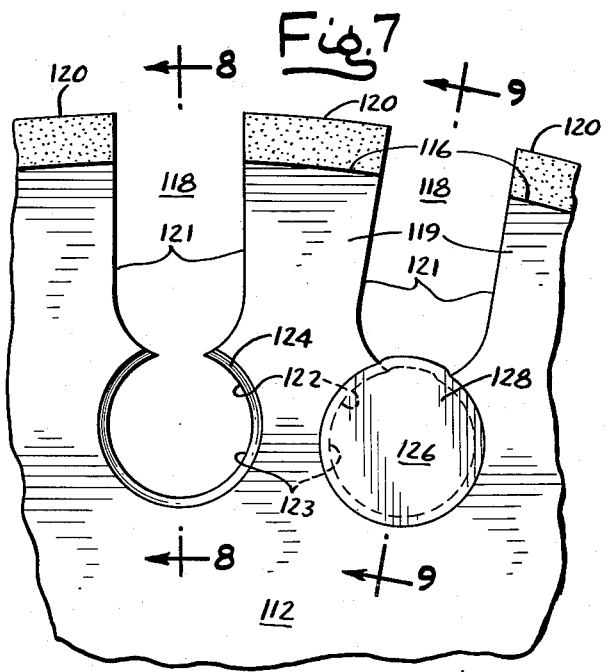
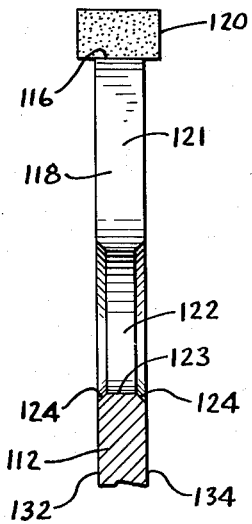
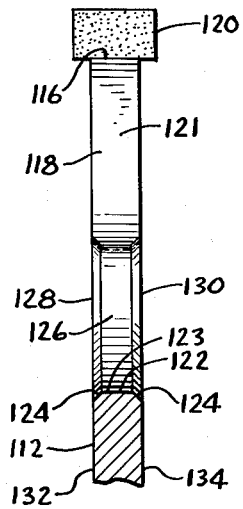
INVENTOR.
MARTIN HOERER

United States Patent Office 2,990,828
Patented July 4, 1961

2,990,828
ROTARY SEGMENTAL SAW WITH RIM RIGIDIFYING AND SILENCING MEANS

Martin Hoerer, Highland Park, Ill., assignor to Super-Cut, Inc., Chicago, Ill., a corporation of Illinois
Filed Sept. 19, 1960, Ser. No. 56,993
15 Claims. (Cl. 125—15)

The present invention relates to rotary stone cutting saws of the type which is commonly employed for sawing limestone, marble, granite and the like and which embodies for stone cutting purposes a series of peripheral, circumferentially spaced segments in the form of metallic matrices with crushed or fragmented diamond particles distributed throughout the same. Such saws further involve in their general organization a flat sided, circular, disk-like metal saw body or blade having a central arbor hole therein, and to the periphery of which the metallic matrices or segments are applied by a soldering, brazing, or other similar operation involving the application of heat.

It has long been the practice in connection with saws of this general character, particularly in connection with large diameter saws, to provide a series of elongated, radially and inwardly extending, circumferentially spaced slots in the periphery of the saw body, the segments being applied to the body between adjacent slots with each segment preferably, but not necessarily, spanning the distance between adjacent slots. The purpose and function of such slots is three-fold, their principal purpose being to dissipate heat during application of the segments to the periphery of the wheel body. In the absence of such circumferentially spaced slots, especially where blades of small thickness are concerned, the application of localized heat to the rim region is accompanied by thermal expansion of the metal at the region of heat application and a consequent buckling of the rim due to rim elongation. Experience has shown that subsequent cooling of the metal will not restore the rim to its former substantially planar condition. Thus, by making the cutting means of the saw in the form of individual segments to produce what is commonly referred to as a segmental saw, and by placing the individual segments between adjacent slots as briefly outlined above, the heat which is applied to the intervening metal between the adjacent pairs of slots is isolated within the intervening metal and is, to a large extent, dissipated by the edges of the slots, while any metal expansion which may take place in a circumferential direction is localized and does not affect the adjacent regions of the rim on either side thereof so that buckling of the rim is effectively prevented.

An additional feature that is attendant upon the provision of such peripheral slots resides in the flushing action which takes place when the saw is placed in service. By their provision, the coolant medium (which usually is water), together with the cuttings resulting from the sawing action, is more effectively flushed from the cutting area in that the slots provide relief areas or pockets into which the sludge may enter for subsequent conduction away from the cutting area. A similar and related advantage which is afforded by the peripheral slots lies in the fact that the interstices afforded thereby function in the manner of small reservoirs or pockets for carrying the coolant fluid to the kerf undergoing cutting, while at the same time the open mouths of the slots at the extreme outer ends thereof allow the kerf to be repeatedly exposed for intimate contact with the coolant fluid which, in the absence of such slots, might otherwise not find access to the kerf.

The widespread use of saw bodies having slotted peripheries is accompanied by at least one series limitation, namely, the tendency for the saw body or blade to develop cracks at the inner ends or bottoms of the various slots. Whereas, with an unslotted saw body, the rim thereof is relatively tight or rigid, when the slots are provided in the rim, the rigidity of the rim region is destroyed to a certain extent so that there is a tendency for the portions of the rim which are disposed between tthe various slots to flutter laterally in opposite directions out of the general plane of the saw body. This repeated high frequency flexing of the peripheral sections of the wheel body in opposite directions laterally, when coupled with the tangential application of frictional drag and pressure thereto, results in the aforementioned cracking of the wheel body.

In an effort to minimize cracking as explained above, it has been proposed to enlarge the inner ends of the slots by causing the same to intersect with respect holes of larger diameter than the slot widths or, in other words, causing the inner ends of the slots to terminate in circular enlargements. This expedient has proven effective in reducing cracking to a minimum but it has been found that where such holes are provided the noise factor has been greatly increased and operation of the saw is accompanied by a continuous and shrill sound having various harmonic overtones, and which is extremely annoying to the operators, and results in nervous fatigue and often making it necessary to resort to the use of ear plugs. While the exact cause of such noise is not definitely known, it is believed that the same is of resonant origin and is caused by the rush of air past the open sides of the small pockets afforded by the enlargements at the inner ends of the various slots. Stated otherwise, the wheel body as a whole apparently operates in the manner of the toy known as a whistling top which, as it spins, sets up resonant vibrations of air within itself.

The present invention is designed to overcome the above-noted limitation that is attendant upon the use of saw bodies having circumferentially spaced, radially extending, peripheral slots with enlarged inner ends and, toward this end, the invention contemplates the provision of a saw body which retains such peripheral slots, but in which the enlarged inner ends of the slots are filled with a material, preferably a metal, under compression and which serves to exclude from such inner ends the presence of air which has the necessary elasticity to support a condition of resonance which otherwise might result in the aforementioned objectionable noise.

According to the present invention, the placement within the enlarged ends of the slots of such a substance under compression not only dampens such a resonant condition and thus eliminates objectionable noise, but it further places the rim as a whole under compression and thus rigidifies or stiffens the rim of the blade, while at the same time the phenomenon by means of which cracking of the slots at the bases thereof is prevented, as previously outlined, is preserved.

The provision of a segmental saw of the character briefly outlined above being the principal object of the invention, numerous other objects and advantages not at this time enumerated will become readily apparent as the following description ensues.

In the accompanying two sheets of drawings forming a part of this specification, several embodiments of the invention have been illustrated.

In these drawings:

FIG. 1 is a fragmentary plan view of a composite segmental saw constructed in accordance with the principles of the present invention with certain parts removed in the interest of clarity;

FIG. 2 is an enlarged fragmentary view showing a peripheral portion of the structure shown in FIG. 1 and with certain parts removed to more clearly reveal the nature of the invention;

FIG. 3 is a sectional view taken substantially along the line 3—3 of FIG. 2;

FIG. 4 is a sectional view taken substantially along the line 4—4 of FIG. 2;

FIG. 5 is a fragmentary sectional view, somewhat schematic in its representation of a pair of installation dies and showing the same in position preparatory to effecting their shaping operation upon a filler plug employed in connection with the invention;

FIG. 6 is a fragmentary sectional view similar to FIG. 5 showing the dies in their final forming position;

FIG. 7 is a fragmentary plan view similar to FIG. 2 showing a slightly modified form of segmental saw constructed in accordance with the principles of the invention;

FIG. 8 is a sectional view taken substantially along the line 8—8 of FIG. 7; and FIG. 9 is a sectional view taken substantially along the line 9—9 of FIG. 7.

Referring now to the drawings in detail and in particular to FIGS. 1 to 5 inclusive wherein one embodiment of the invention has been shown, a segmental saw has been designated in its entirety at 10 and it is comprised of a saw blade, core or plate 12 in the form of a substantially flat circular disk-like body of metal, preferably steel, having the usual central arbor opening 14 formed therein. Rotary stone cutting saws of the type with which the present invention is concerned are made in various sizes ranging in diameter from a matter of inches to ten or more feet, with the thickness of the blade 12 increasing commensurately with the blade diameter.

The circular rim 16 of the blade 12 is interrupted at spaced regions therearound by a series of inwardly extending, elongated, equally spaced slots 18, the axes of which extend radially of the blade. The intervening portions 19 of the blade, i.e. the peripheral portions of the blade which exist between adjacent pairs of slots, carry at their outer margins a series of segmental cutting segments 20 which are in the form of metal matrices throughout which there are distributed quantities of crushed or fragmented diamonds. The cutting segments are of elongated rectilinear block-like design with each segment preferably, but not necessarily, spanning the distance between an adjacent pair of slots 18. The segments are slightly wider than the thickness of the metal of the blade 12 and they are centered in position on the outer margins of the intervening portions 19 so that the side faces thereof are offset laterally outwardly from the general planes of the side faces of the blade. The segments are secured in position on the interrupted rim 16 of the blade 12 by a suitable soldering, brazing or similar operation involving the application of heat. The nature of the cutting segments 20 per se and their mode of application to the rim 16 of the blade 12 form no part of the present invention and no claim is made herein to any novelty associated with the same. Although these segments 20 have been shown as being rectilinear in their design and comprised solely of a metal matrix with the diamond material distributed throughout the same, the segments may be of a composite nature and embody the principles set forth in the copending application of Leopold H. Metzger, Serial No. 51,406, filed on August 23, 1960, and entitled "Rotary Saw Blade with Peripheral Diamond Teeth and Method of Assembling the Same," or they may be otherwise constructed.

The side walls 21 of the slots 18 preferably extend in parallelism (FIG. 2) and the inner ends thereof terminate in semi-circular enlargements 22 which, in the illustrated form of the invention, are of a diameter somewhat greater than the width of the slots. The arcuate extent of the semi-circular enlargements is thus in excess of 180°.

The depth, i.e. the radial extent, of the slots 18 is not critical within limits nor is the width or the number of slots. For example, a blade having a diameter of twenty-four inches may be provided with thirty-six equally spaced slots which are seven-eighths of an inch in depth and three-sixteenths of an inch wide. Irrespective however of the size, shape or number of slots employed, the essential features of the invention are at all times preserved.

As best seen in FIGS. 3 and 4, the circular wall 23 of each slot enlargement 22 is bevelled or otherwise relieved as at 24 at the opposite rims thereof and each enlargement has disposed therein a generally cylindrical filler plug 26 which completely fills the enlargement, including the bevelled regions thereof, and which has its opposite planar end faces 28 and 30 lying substantially in the planes of the side faces 32 and 34 respectively of the opposite sides of the blade. The various filler plugs 26 are formed of a relatively soft metal such as copper and they exist under compression within the enlarged openings which they fill. The provision of these filler plugs constitutes one of the principal features of the present invention inasmuch as they impart to the saw 10 as a whole certain advantages not present in connection with conventional slotted blade bodies including rim rigidifying and noise inhibiting characteristics as will be set forth in detail presently.

The filler plugs 26 may be applied to the blade by a pressing operation as schematically illustrated in FIGS. 5 and 6, a cylindrical metal slug 40 being positioned in the enlargement 22 to be filled and operated upon by lower and upper pressing dies 42 and 44 respectively to compress the metal of the slug and cause the same to fill the cavity existing by virtue of the enlargement 22. The quantity of metal contained in the slug 40 is substantially equal in volume to the volume of the void existing by reason of the enlargement so that the dies 42 and 44 exert a simulated riveting operation upon the slug while at the same time causing the cylindrical slug to expand radially within the circular enlargement 22 and into intimate face-to-face contact with the entire wall surface area of the latter including the bevelled regions 24. Any excess metal which may project laterally from the enlargements 22 may subsequently be removed by a grinding operation. The provision of the bevelled surfaces 24 serves to lock the filler plug 26 securely within the enlargement 26 against lateral dislodgement when the saw 10 is put into service.

The circular enlargements 22 at the inner ends of the various slots 18 serve to prevent fracture of the blade at the base of the slots, such fracture being a common occurrence in the absence of such enlargements. The increased linear extent of the slots in the base regions which is afforded by the enlargements 22 distributes the stress and strain of flexing between adjacent intervening portions 19 over a larger linear extent of the saw blade 12 so that these portions may "flutter" laterally in one direction or the other, as they usually do when the wheel is in service, without severely localizing the points of metal stress at the extreme bases of the slots where the adjacent portions 19 are joined together.

In the absence of the compressed metal filler plugs 26, it has been found that there is a tendency for extreme noise to occur when the saw is placed in service. Such noise is in the nature of a relatively loud howl or whistle and it is believed to exist by virtue of the resonance of air within the individual pockets created by the enlargements 22. It is further believed that the circumferential sweep of the individual air pockets through the ambient atmosphere sets up not only resonant vibrations of air which have a frequency within the audible range, but also sets up harmonic vibrations of a supersonic nature and of an extremely high frequency which, when absorbed by the surrounding metal of the blade, sets up internal vibrations therein which may affect the crystal structure of the alloy steel and further enhance the creation of cracks in the vicinity of the slots. The existence of the metal filler plugs 26 within the enlargements 22 completely displaces the air within the latter so that the source of vibration is eliminated, thus resulting in a saw which is devoid of objectionable noise and stress factors.

It has been stated heretofore that the various filler plugs 26 exist under compression within the enlargements 22 which they completely fill. Thus, due to the outward pressure of the filler plugs against the wall surface of the enlargements, the rim region of the blade 12 is placed under an increased degree of compression and is thus rigidified or stiffened, so to speak, so that proper blade tension will be maintained at all times with no buckling of the blade rim.

In FIGS. 7, 8 and 9 a slightly modified form of saw assembly 110 has been illustrated. In this form of the invention the various radial slots 118 are shown as being appreciably wider and of lesser depth than the slots 18. Otherwise the blade body 112 remains substantially the same as the blade body 12 associated with the previously described form of the invention illustrated in FIGS. 1 to 4 inclusive. Due to the similarity of construction, and to avoid needless repetition of description, similar reference numerals but of a higher order have been applied to the corresponding parts as shown between FIGS. 1, 2, 3 and 4 and FIGS. 7, 8 and 9, respectively.

In this latter form of the invention, the void 122 which corresponds to the void or enlargement 22 of the previously described form, is of a diameter equal to the width of the slot 118 so that this void may be regarded as being actually the bottom region of the slot. The side walls 121 of the slot 118 are formed with a pair of opposed projections 125 at the region of communication or juncture between the void 122 and the slot proper, and the semi-circular wall 123 of the void are bevelled or otherwise relieved as at 124 for plug retaining purposes. A generally cylindrical filler plug 126 is disposed within each void 122 and completely fills the same. These filler plugs 126 may be applied to the blade 112 in the manner previously described in connection with the application of the plugs 26 and as illustrated in FIGS. 5 and 6.

In the operation of the form of the invention shown in FIGS. 7, 8 and 9, the slots 118, voids 122 and filler plugs 126 serve substantially the same purposes as the slots 18, voids 22 and plugs 26 respectively. At the risk of repetition it may be stated that the slots 118 enable heat-application of the individual segmental cutting segments 120 to the rim 116 of the blade 112 without buckling of the rim. The voids 122 prevent cracking of the blade at the bases of the slots 118. The filler plugs 126 serve the dual function previously described, namely to inhibit noise and to tighten the rim region of the blade 112. Otherwise the operation of the saw assembly 110 remain substantially the same as that of the saw assembly 10.

The invention is not to be limited to the exact arrangement of parts shown in the accompanying drawings or described in this specification as various changes in the details of construction may be resorted to without departing from the spirit of the invention. The forms of the invention illustrated herein are merely exemplary of forms which have been devised for commercial exploitation of the invention and numerous other forms are contemplated. Therefore, only insofar as the invention has particularly been pointed out in the accompanying claims is the same to be limited.

Having thus described the invention what I claim as new and desire to secure by Letters Patent is:

1. A rotary segmental stone cutting saw of the character described and comprising in combination a substantially flat disk-like circular metal saw blade, the circular rim of which is interrupted by a series of inwardly extending elongated slots which are spaced in a circumferential direction, a filler plug formed of a material which is softer than the metal of the blade and disposed within the bottom region of each slot and compressed between the side walls of the latter, and an elongated arcuate cutting element abutting against, bonded to and extending circumferentially of the rim between each pair of adjacent slots.

2. A rotary segmental stone cutting saw of the character described and comprising in combination a substantially flat disk-like circular steel saw blade, the circular rim of which is interrupted by a series of inwardly extending elongated slots which are spaced in a circumferential direction, a filler plug formed of copper and disposed within the bottom region of each slot and compressed between the side walls of the latter, and an elongated arcuate cutting element abutting against, bonded to and extending circumferentially of the rim between each pair of adjacent slots.

3. A rotary segmental stone cutting saw of the character described and comprising in combination a substantially flat disk-like circular steel saw blade, the circular rim of which is interrupted by a series of inwardly extending elongated slots which are spaced in a circumferential direction, a filler plug formed of a material which is softer than the metal of the blade and disposed within the bottom region of each slot and compressed between the side walls of the latter, interengaging means on said filler plug and side walls for preventing lateral displacement of the filler plug, and an elongated arcuate cutting element abutting against, bonded to and extending circumferentially of the rim between each pair of adjacent slots.

4. A rotary segmental stone cutting saw of the character described and comprising in combination a substantially flat disk-like circular metal saw blade, the circular rim of which is interrupted by a series of inwardly extending elongated radial slots which are spaced in a circumferential direction, the bottom regions of the slots being provided with side walls, the opposite edges of which are bevelled, a filler plug formed of a material which is softer than that of the blade and disposed within the bottom region of each slot and effectively filling the same, and an elongated arcuate cutting element abutting against, bonded to and extending circumferentially of the rim between each pair of adjacent slots.

5. A rotary segmental stone cutting saw of the character described and comprising in combination a substantially flat disk-like circular metal saw blade, the circular rim of which is interrupted by a series of inwardly extending elongated radial slots which are spaced in a circumferential direction, the inner end of each slot being enlarged, a filler plug formed of a material which is softer than the metal of the blade disposed within the enlarged inner end of each slot and effectively filling the same, and an elongated arcuate cutting element abutting against, bonded to and extending circumferentially of the rim between each pair of adjacent slots.

6. A rotary segmental stone cutting saw of the character described and comprising in combination a substantially flat disk-like circular metal saw blade, the circular rim of which is interrupted by a series of inwardly extending elongated radial slots which are spaced in a circumferential direction, the inner end of each slot being enlarged, a filler plug formed of a material which is softer than the metal of the blade disposed within the enlarged inner end of each slot and effectively filling the same, interengaging means on said filler plug and the surrounding wall of the slot enlargement for preventing lateral displacement of the filler plug, and an elongated arcuate cutting element abutting against, bonded to and extending circumferentially of the rim between each pair of adjacent slots.

7. A rotary segmental stone cutting saw of the character described and comprising in combination a substantially flat disk-like circular metal saw blade, the circular rim of which is interrupted by a series of inwardly extending elongated radial slots presenting parallel side wall surfaces and which are spaced in a circumferential direction, the inner end of each slot being formed with a semi-circular enlargement of a diameter greater than the distance between the parallel side wall surfaces of the slot, and the arcuate extent of which is greater than 180°, a filler plug formed of a metal which is softer than that of the blade disposed within and effectively filling said semi-circular enlargement, and an elongated arcuate cutting element abutting against, bonded to and extending circumferentially of the rim between each pair of adjacent slots.

8. A rotary segmental stone cutting saw of the character described and comprising in combination a substantially flat disk-like circular metal saw blade, the circular rim of which is interrupted by a series of inwardly extending elongated radial slots presenting parallel side wall surfaces and which are spaced in a circumferential direction, the inner end of each slot being formed with a semi-circular enlargement of a diameter greater than the distance between the parallel side wall surfaces of the slot, and the arcuate extent of which is greater than 180°, a filler plug formed of a metal which is softer than that of the blade disposed within and effectively filling said semi-circular enlargement, said filler plug existing under compression within said enlargement and exerting an outward thrust in all directions against the marginal wall of the enlargement, and an elongated arcuate cutting element abutting against, bonded to and extending circumferentially of the rim between each pair of adjacent slots.

9. A rotary segmental stone cutting saw of the character described and comprising in combination a substantially flat disk-like circular metal saw blade, the circular rim of which is interrupted by a series of inwardly extending elongated radial slots presenting parallel side wall surfaces and which are spaced in a circumferential direction, the inner end of each slot being formed with a semi-circular enlargement of a diameter greater than the distance between the parallel side wall surfaces of the slot, and the arcuate extent of which is greater than 180°, a filler plug formed of a metal which is softer than that of the blade disposed within and effectively filling said semi-circular enlargement, said filler plug existing under compression within said enlargement and exerting an outward thrust in all directions against the marginal wall of the enlargement, interengaging means on said filler plug and marginal wall of the enlargement for preventing lateral displacement of the plug relatively to the blade, and an elongated arcuate cutting element abutting against, bonded to and extending circumferentially of the rim between each pair of adjacent slots.

10. A rotary segmental stone cutting saw of the character described and comprising in combination a substantially flat disk-like circular metal saw blade, the circular rim of which is interrupted by a series of inwardly extending elongated radial slots presenting parallel side wall surfaces and which are spaced in a circumferential direction, the inner end of each slot being formed with a semi-circular enlargement of a diameter greater than the distance between the parallel side surfaces of the slot, and the arcuate extent of which is greater than 180°, the curved wall surface of said enlargement being provided with relieved side edges, a filler plug formed of a metal which is softer than that of the blade, disposed within and substantially filling said enlargement and in intimate contact with the curved wall surface thereof including the relieved edges, and an elongated arcuate cutting element abutting against, bonded to and extending circumferentially of the rim between each pair of adjacent slots.

11. A rotary segmental stone cutting saw of the character described and comprising in combination a substantially flat disk-like circular metal saw blade, the circular rim of which is interrupted by a series of inwardly extending elongated radial slots presenting parallel side wall surfaces and which are equally spaced from one another in a circumferential direction, the bottom wall surface of each slot being curved, said side wall surfaces being formed with oppositely disposed opposed projections thereon in the immediate vicinity of said curved bottom wall surface, a filler plug of a material which is softer than the metal of the blade disposed within the bottom region of the slot and effectively filling the space existing within the slot between said opposed projections and the curved bottom wall surface, and an elongated arcuate cutting element abutting against, bonded to and extending circumferentially of the rim between each pair of adjacent slots.

12. A rotary segmental stone cutting saw of the character described and comprising in combination a substantially flat disk-like circular metal saw blade, the circular rim of which is interrupted by a series of inwardly extending elongated radial slots presenting parallel side wall surfaces and which are equally spaced from one another in a circumferential direction, the bottom wall surface of each slot being curved, said side wall surfaces being formed with oppositely disposed opposed projections thereon in the immediate vicinity of said bottom wall surface, a filler plug of a material which is softer than the metal of the blade disposed within the bottom region of the slot and effectively filling the space existing within the slot between said opposed projections and the curved bottom wall surface, interengaging means on said filler plug and bottom wall surface for preventing lateral displacement of the plug, and an elongated arcuate cutting element abutting against, bonded to and extending circumferentially of the rim between each pair of adjacent slots.

13. A rotary segmental stone cutting saw of the character described and comprising in combination a substantially flat disk-like circular metal saw blade, the circular rim of which is interrupted by a series of inwardly extending elongated radial slots presenting parallel side wall surfaces and which are equally spaced from one another in a circumferential direction, the bottom wall surface of each slot being curved, said side wall surfaces being formed with oppositely disposed opposed projections thereon in the immediate vicinity of said bottom wall surface, a filler plug of a metal which is softer than that of the blade disposed within the bottom region of the slot and effectively filling the space existing within the slot between said opposed projections and the curved bottom wall surface, said plug having end surfaces which are coplanar with the side faces of the blade respectively, interengaging means in said filler plug and bottom wall surface for preventing lateral displacement of the plug, and an elongated arcuate cutting element abutting against, bonded to and extending circumferentially of the rim between each pair of adjacent slots.

14. A rotary segmental stone cutting saw of the character described and comprising in combination a substantially flat disk-like circular metal saw blade, the circular rim of which is interrupted by a series of inwardly extending elongated radial slots presenting parallel side wall surfaces and which are equally spaced from one another in a circumferential direction, the bottom wall surface of each slot being curved, said side wall surfaces being formed with oppositely disposed opposed projections thereon in the immediate vicinity of said bottom wall surface, a filler plug of a metal which is softer than that of the blade disposed within the bottom region of the slot and effectively filling the space existing within the slot between said opposed projections and the curved bottom wall surface, a dovetail connection between said plug and the bottom wall surface of the slot for preventing lateral displacement of the plug, and an elongated arcuate cutting element abutting against, bonded to and extending circumferentially of the rim between each pair of adjacent slots.

15. A rotary segmental stone cutting saw of the character described and comprising in combination a substantially flat disk-like circular metal saw blade, the circular rim of which is interrupted by a series of inwardly extending elongated radial slots presenting parallel side wall surfaces and which are equally spaced from one another in a circumferential direction, the bottom wall surface of each slot being curved, said side wall surfaces being formed with oppositely disposed opposed projections thereon in the immediately vicinity of said bottom wall surface, a filler plug of a metal which is softer than that of the blade disposed within the bottom region of the slot and effectively filling the space existing within the slot between said opposed projections and the curved bottom wall surface, said filler plug existing under compression within the space within which it is confined and exerting outward pressure on the wall surfaces of said space in all directions, a dovetail connection between said plug and the bottom wall surface of the slot for preventing lateral displacement of the plug, and an elongated arcuate cutting element abutting against, bonded to and extending circumferentially of the rim between each pair of adjacent slots.

References Cited in the file of this patent

UNITED STATES PATENTS 2,830,474    Braucher _____ Apr. 15, 1958